(12) United States Patent
Etienne-Cummings et al.

(10) Patent No.: US 6,897,426 B2
(45) Date of Patent: May 24, 2005

(54) SELF-CONTAINED INTEGRATED COLOR PROCESSING IMAGER

(76) Inventors: Ralph Roque Etienne-Cummings, 1520 Kingman Pl., NW., Washington, DC (US) 20005; M. Anthony Lewis, 805 E. Buckthorn Cir., Mahomet, IL (US) 61853; Philippe Olivier-Marie Pouliquen, 4222 Falls Rd., Baltimore, MD (US) 21211

( * ) Notice: Subject to any disclaimer, the term of this patent is extended or adjusted under 35 U.S.C. 154(b) by 89 days.

(21) Appl. No.: 10/214,123

(22) Filed: Aug. 8, 2002

(65) Prior Publication Data

US 2003/0034435 A1 Feb. 20, 2003

Related U.S. Application Data

(60) Provisional application No. 60/310,736, filed on Aug. 9, 2001.

(51) Int. Cl.$^7$ ................................. H01L 27/00
(52) U.S. Cl. ................................. 250/208.1; 250/214 R
(58) Field of Search .................. 250/226, 208.1, 250/214 R, 229; 382/162, 169, 171, 209, 164; 348/571, 575, 672, 675; 358/520, 522

(56) References Cited

U.S. PATENT DOCUMENTS 4,984,072 A  *  1/1991  Sandrew ..................... 348/34

* cited by examiner

*Primary Examiner*—Que T. Le
(74) *Attorney, Agent, or Firm*—Whitham, Curtis & Christofferson, P.C.

(57) ABSTRACT

A 128(H)×64(V)×RGB CMOS imager is integrated with region-of-interest selection, RGB-to-HSI transformation, HSI-based pixel segmentation, 36-bins×12bits HSI histogramming and sum-of-absolute-difference template matching. 32 learned color templates are stored and compared to each image. Running at 30 fps, it uses 1 mW.

16 Claims, 6 Drawing Sheets

SELF-CONTAINED INTEGRATED COLOR PROCESSING IMAGER

This application claims the benefit of provisional application No. 60/310,736, filed Aug. 9, 2001.

BACKGROUND OF THE INVENTION (1) Field of the Invention

This invention is related to color image sensor, particularly to color integrated image processing for a focal plane.

(2) Brief Description of Related Art

CMOS integrated circuits technology readily allows the incorporation of photodetector arrays and image processing circuits on the same silicon die. This has led to the recent proliferation in cheap and compact digital cameras, system-on-a-chip video processors, and many other cutting-edge commercial and research imaging products. The concept of using CMOS technology for combining sensing and processing was not spear-headed by the imaging community. It actually emerged in mid 80's from the neuromorphic engineering community, developed by Carver Mead and collaborators [1]. Mead's motivation was to mimic the information processing capabilities of biological organisms; biology tends to optimize information extraction by introducing processing at the sensing epithelium. This approach to sensory information processing, which was later captured with terms such as "sensory processing" and "computational sensors," produced a myriad of vision chips, whose functionalities include edge detection, motion detection, stereopsis and many others examples can be found in references [2].

The preponderance of the work on neuromorphic vision has focused on spatiotemporal processing on the intensity of light (gray scale images) because the intensity can be readily transformed into a voltage or current using basic integrated circuits components: photodiodes, photogates, and phototransistors. These devices are easily implemented in CMOS technologies using no additional lithography layers. On the other hand, color image processing has been limited primarily to the commercial camera arena because three additional masks are required to implement red (R), green (G) and blue (B) filters. The additional masks make fabrication of color sensitive photodetection arrays expensive and, therefore, not readily available to researchers. Nonetheless, a large part of human visual perception is based on color information processing. Consequently, neuromorphic vision systems should not ignore this obviously important cue for scene analysis and understanding.

There has been a limited amount of previous work on neuromorphic color processing. The vast majority of color processing literature addresses standard digital image processing techniques. That is, they consist of a camera that is connected to a frame-grabber that contains an analog-to-digital converter (ADC). The ADC interfaces with a digital computer, where software algorithms are executed. Of the few biologically inspired hardware papers, there are clearly two approaches. The first approach uses separate imaging chips and processing chips [3], while the second approach integrates a handful of photodetectors and analog processing circuitry [4]. In the former example, standard cameras are connected directly to analog VLSI chips that demultiplex the video stream and store the pixel values as voltages on arrays of capacitors. Arrays as large as 50×50 pixels have been realized to implement various algorithms for color constancy [3]. As can be expected, the system is large and clumsy, but real-time performance is possible. The second set of chips investigate a particular biologically inspired problem, such as RGB (red,green, blue color)-to-HSI (Hue, Saturation and Intensity) conversion using biologically plausible color opponents and HSI-based image segmentation, using a very small number of photodetectors and integrated analog VLSI circuits [4]. Clearly, the goal of the latter is to demonstrate a concept and not to develop a practical system for useful image sizes.

SUMMARY OF THE INVENTION

An object of this invention is to address the gap in the silicon vision literature by providing an integrated, large-array of color photodetectors and on-chip processing. Another object of this invention is to design an integrated chip for the recognition of objects based on their color signatures.

Our approach is to demonstrate a concept of RGB color conversion to HIS using biologically plausible color opponents, and HIS-based image segmentation. However, we also use an architecture and circuitry that allow high-resolution imaging and processing on the same chip. In addition, we include higher-level processing capabilities for image recognition. Hence, our chip can be considered to be a functional model of the early vision, such as the retina and Visual Area #1 (V1) of the cortex, and higher visual cortical regions, such as the Inferotemporal Area (IT) of the cortex.

The color imager is integrated with analog and digital signal processing circuitry to realize focal-plane region-of-interest selection, RGB-to-HIS transformation, HIS-based segmentation, 36-bin HIS histogramming and sum-of-absolute-difference (SAD) template matching for object recognition. This self-contained color imaging and processing chip, designed as a front-end for micro-robotics, toys and "seeing-eye" computers, learns the identity of objects through their signature. The signature is composed of a HIS histogram template. A minimum intensity and minimum saturation filter is employed before histogramming. The template is stored at the focal-plane during a learning step. During the recognition step, newly acquired images are compared with the stored templates using a SAD computation, the minimum SAD result indicates the closest match.

TABLE I: SUMMARY OF PERFORMANCE

DETAILED DESCRIPTION OF THE INVENTION

Figure 1A:
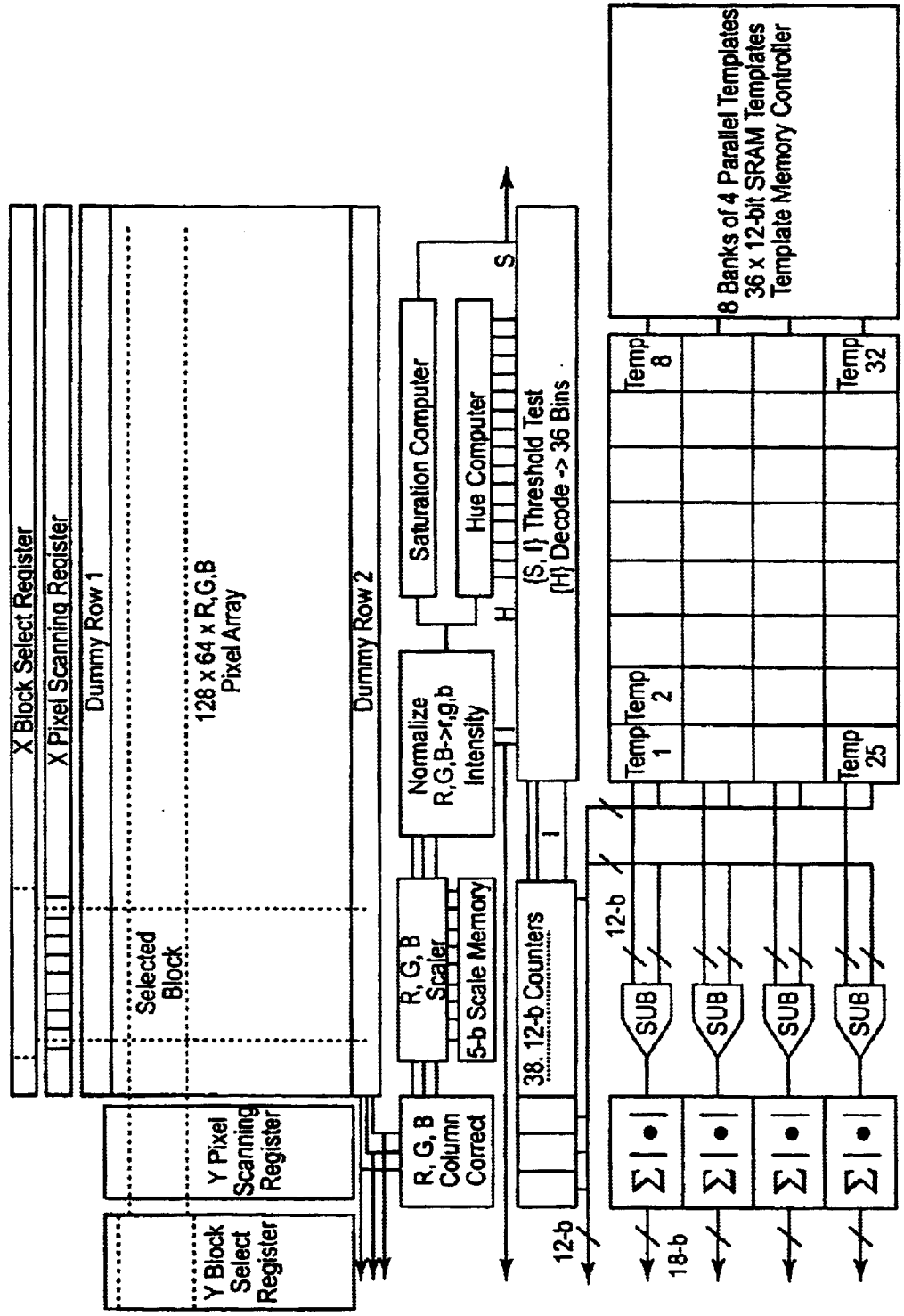
FIG. 1: A) Block diagram of chip. B) Chip layout (light shield layer obscures all details in micrograph).
Figure 1B:
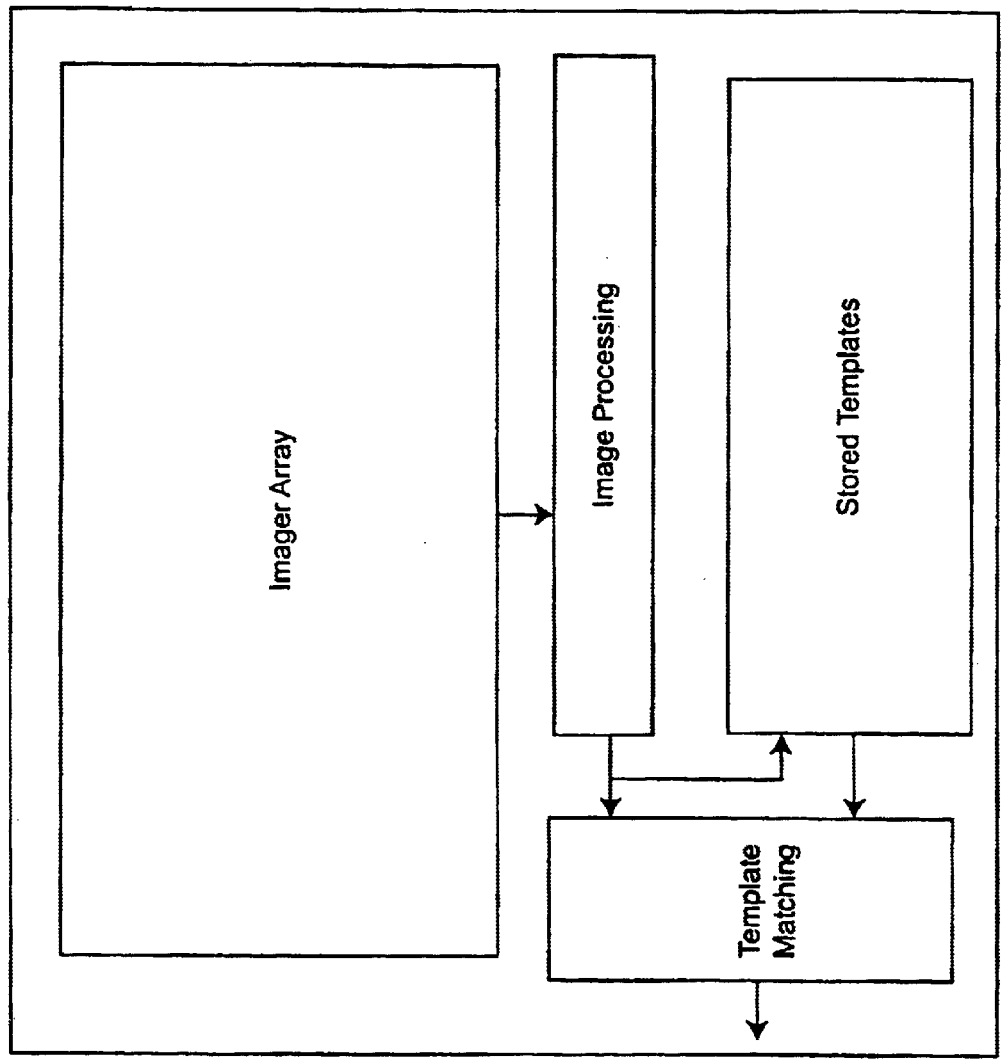

Introduction: A 128(H)×64(V)×RGB CMOS imager is integrated with mixed signal processing circuitry to realize focal-plane region-of-interest selection, RGB-to-HSI transformation, HSI-based segmentation, 36-bins HSI histogramming and sum-of-absolute-difference (SAD) template matching. This self-contained color imaging and processing chip, designed as a front-end for micro-robotics, toys and "seeing-eye" computers, learns the identity of specially coded color objects through their color signature. The signature is composed of a 36-bins×12-bits HSI histogram template. The template is stored at the focal-plane during a learning step. During the recognition step, newly acquired images are compared to 32 stored templates using a SAD computer. The minimum SAD result indicates the closest match. In addition, the chip can be used to segment a color image and identify regions in the scene having particular color characteristics. The location of the matched regions can be used to track objects in the environment. FIG. 1(a) shows a block diagram of the chip. FIG. 1(b) shows a chip layout (the layout is shown because the light shielding layer obscures the details). Table I shows the specifications of the chip. This chip represents the first self-contained color processing imager with focal-plane segmentation, histogramming and template matching capabilities.

Figure 2A:
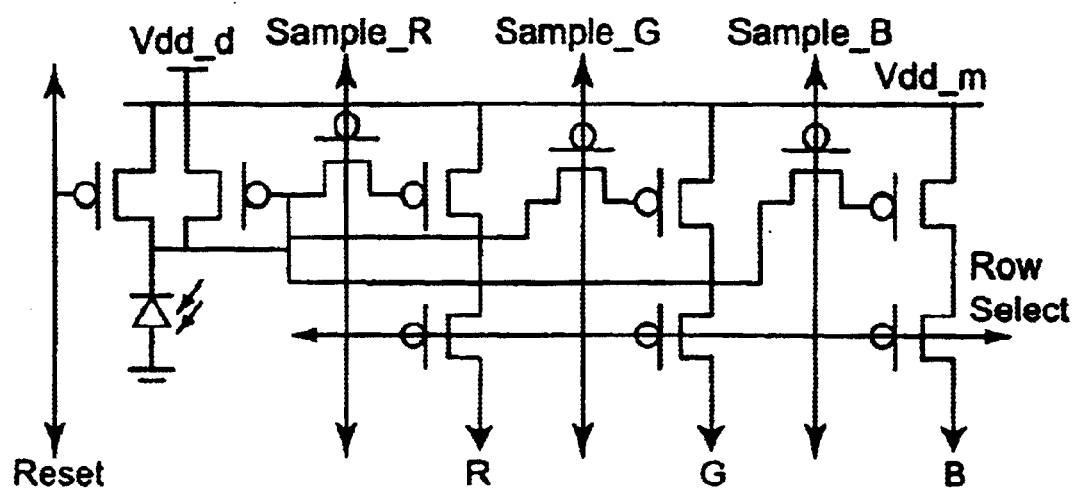
FIG. 2: A) Schematic of the pixel. B) Schematic of the normalization circuit.
Figure 2B:
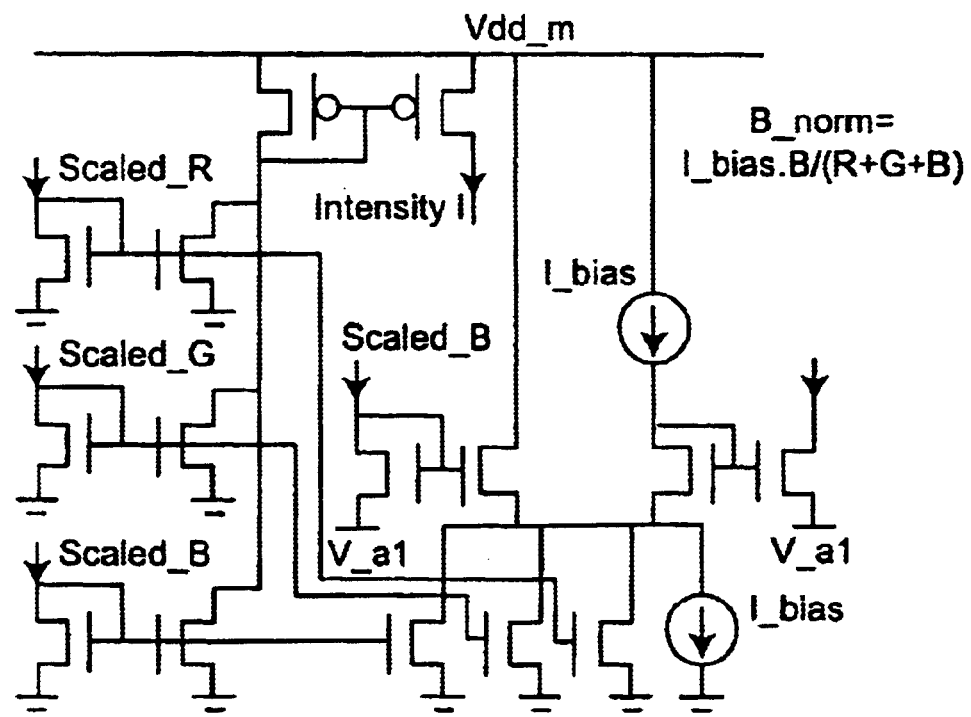
Figure 5B:
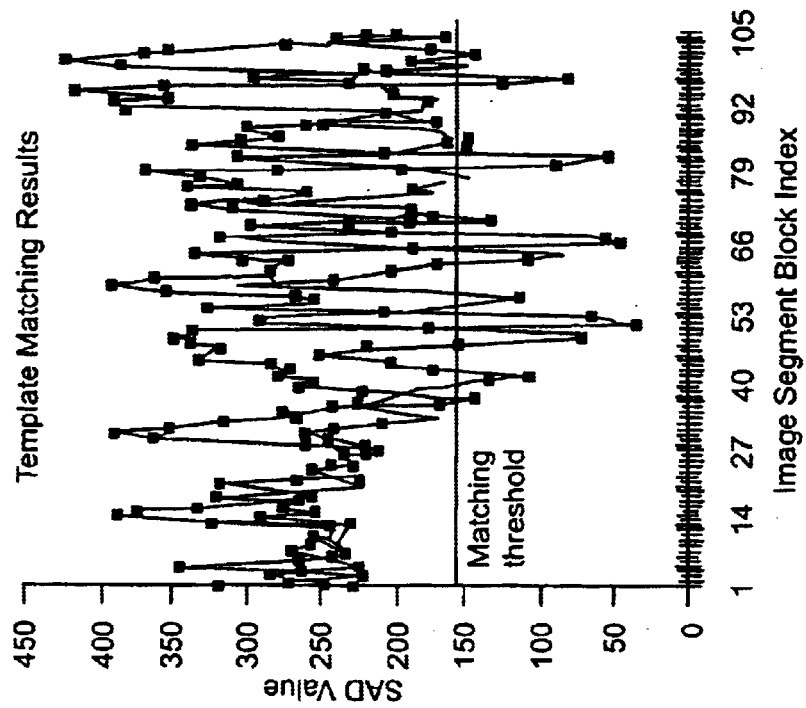
FIG. 5: Template learning and matching.
Figure 5A:
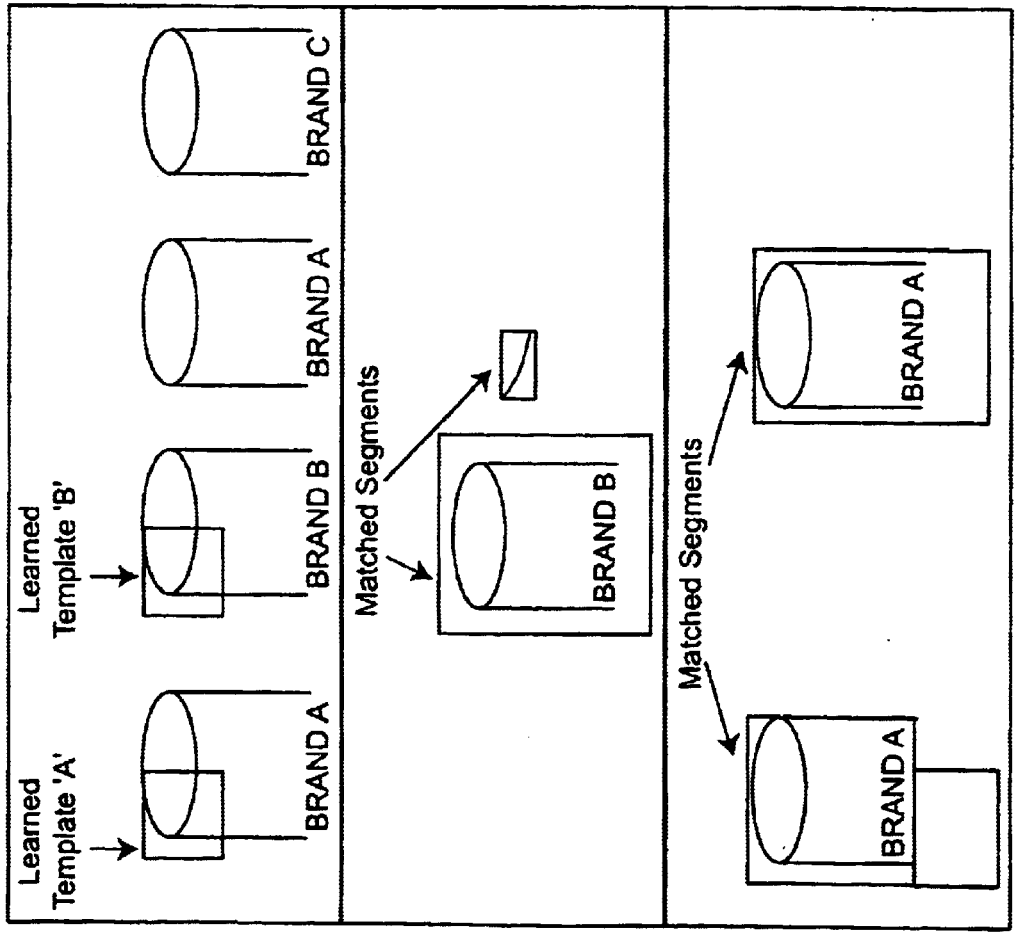

The Imager: In the imager array, three currents, corresponding to R, G and B, values are sampled-and-held for each pixel (a color filter wheel is used in this prototype). To facilitate processing, a current mode imaging approach is adopted. This approach provides more than 120 dB of dynamic range [1], allows RGB scaling for white correction using a multiplying DAC, and RGB normalization using a translinear circuit [5], the normalization guarantees that a large dynamic range of RGB currents are resized for the HSI transformer to operate robustly. However, it limits the speed of operation to approximately 30 fps because the transistors must operate in sub-threshold. For read-out, the pixels can be grouped into blocks of 1×1 (single pixel) to 128×64 (entire array). The blocks can be advanced across the array in single or multiple pixel intervals. The organization of the pixels and the scanning methods are programmable by loading bit patterns in two scanning registers, one for scanning pixels within blocks and the other for scanning blocks across the array. FIG. 2 shows the schematic of the pixel, a portion of the RGB normalizer. FIG. 5 shows a sample image. The output currents of the pixel are amplified using tilted current mirror circuits as shown in FIG. 2(a), where Vdd_d<Vdd_m. The reset switch is included to accelerate the off-transition of the pixel. Not shown in FIG. 2(b) is the scaling circuit, which simply multiplies the RGB components by programable integer coefficients from 1–16. The image in FIG. 5 has been white corrected using the scaling circuit and shows the mismatch that is typical for current mode imagers.

Figure 3A:
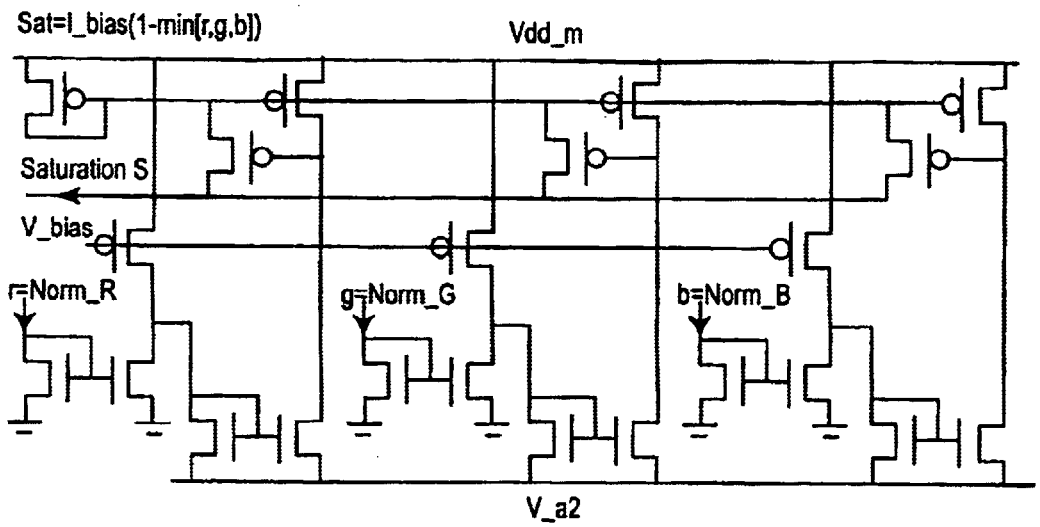
FIG. 3: A) Schematic of Saturation circuit. B) Hue look-up table.
Figure 3B:
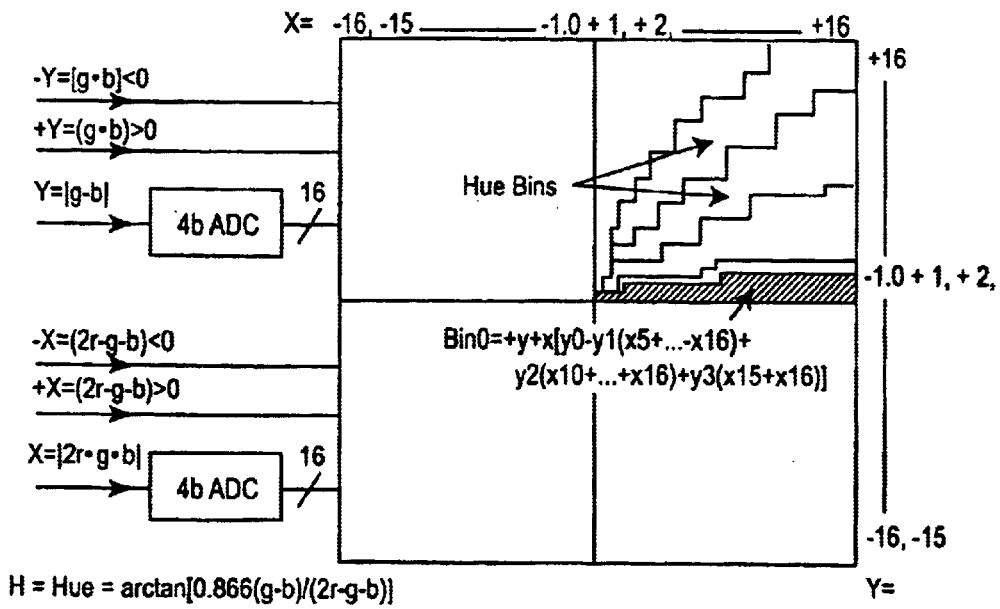
Figures 4A, 4B:
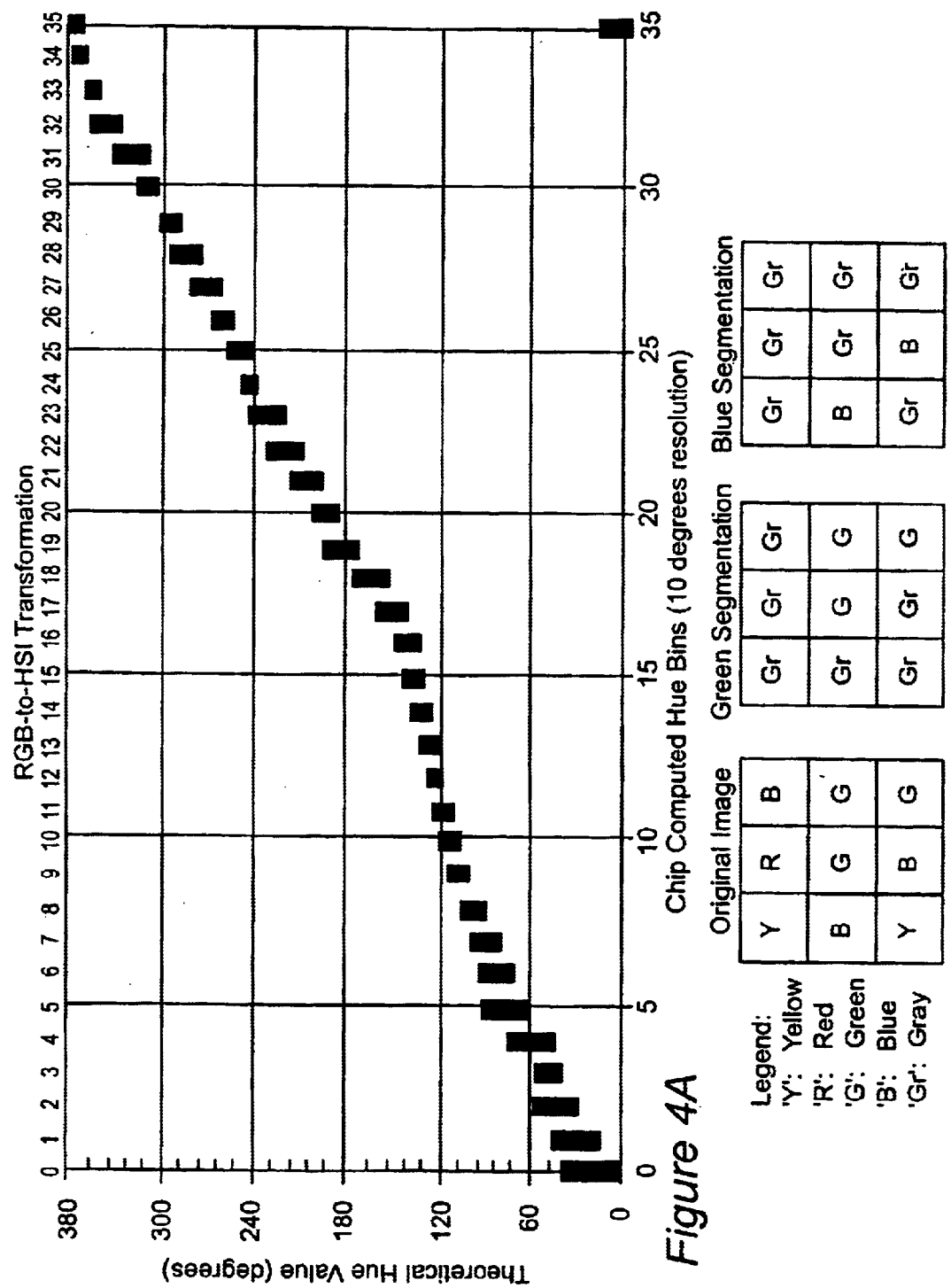
FIG. 4: HSI based pixel segmentation of test image.

RGB-to-HSI and Color Segmentation: The RGB-to-HSI transformer uses an opponent color formulation, reminiscent of biological color processing [5]. The intensity (I) is obtained before normalization by summing the RGB components (see FIG. 2(b)). Saturation (S) is computed by subtracting the minimum of the normalized RGB values from the sum. Hue (H) is given by the arctan[0.866*(g-b)/(2r-g-b)], where rbg are the normalized RGB values [6]. Due to the complexity of computing this function, an analog look-up table is used. We use a hybrid circuit that simply correlates (g-b) and (2r-g-b) and indicates which Hue interval corresponds the RGB values. The (g-b) and (2r-g-b) components are each quantized into 16 levels using a thermometer code 4 bit analog-to-digital conversion. The look-up table maps the 18×18 (the quadrant is given by the signs of the components) input combinations into 36 Hue intervals, each having 10 degrees resolution, to cover the 360 degrees of Hue space. The HSI computation is applied to each RGB value scanned from the array; color segmentation is realized by testing each pixel's HSI values against prescribed values, and the appropriate label is applied to the pixel. FIG. 3 shows the schematic of the Saturation and Hue computation circuits. A loser-take-all circuit is used to find the minimum rgb component for the Saturation (S) value. The mapping of rgb values in Hue bins uses a ROM decoder. FIG. 4 shows the measured relationship between input Hue angle and bin allocation. The plot is obtained by presenting known values of RGB (i.e. Hue angle) to the chip and recording the Hue bins that are triggered. There are some overlaps in the response ranges of the individual bins because of analog imprecision in creating the Hue table's input addresses. Notice, however, that the overlaps are desirably restricted to nearest neighbor bins. Also shown in FIG. 4 is the pixel color segmentation result for a test image of a Rubik's cube. To test the processing unit in isolation, we piped in an external image. The figure shows that the chip clusters parts of the image with similar HSI components into similar bins.

HSI Histogramming and Template Matching: The HSI histogramming step is performed using 36, 12-bit counters to measure the number of pixels that fall within each prescribed HSI interval. After the scanning of the imager is completed, the counters hold the color signature of the scene. During the learning phase, the signature is transferred to one of the 32 on-chip array of SRAM template cells. During the matching phase, the newly acquired signatures are compared to the stored templates, using 8 serial presentations of 4 parallel templates, with the SAD cells. The resultant error for each template is presented off chip, where they can be sorted using a simple micro-controller such as a PIC, to find the best match template. FIG. 5 shows an example of template matching, where the color signature of parts of cans are "learned" and subsequently localized in a scene containing multiple cans. The learned segment is 15×15; during matching, the image is scanned in blocks of 15×15, shifted by 8 pixels. No scanned block matches the learned block exactly. A plot of the SAD error is also shown. Match threshold is set to 155.

Conclusion: The prototype demonstrates that a real-time color segmentation and recognition system can be implemented using a small silicon area and small power budget. By using a fabrication technology with RGB filters, the entire system can be realized with a tiny footprint for compact imaging/processing applications.

While the preferred embodiment of the invention has been described, it will be apparent to those skilled in the art that various modifications may be made in the embodiment without departing from the spirit of the present invention. Such modifications are all within the scope of this invention.

What is claimed is:

1. An intelligent color-based visual sensor, comprising:
   a photo sensor array having a matrix of pixels;
   means for segregating the colors of each one of said pixels into red, green and blue (RGB) colors;
   means for selection of a block of said matrix of pixels;
   means for RGB-to-Hue, Intensity, Saturation (HIS) transformation;
   means for HIS-based pixel segmentation;
   means for HIS histogramming; and
   means for template matching of said HIS histogramming.

2. The intelligent color-based visual sensor as described in claim 1, wherein photo sensors of said photo sensor array comprise photodiodes for each one of said R, G, B colors.

3. The intelligent color-based visual sensor as described in claim 2, wherein currents from said photodiodes are sampled-and-held to facilitate a current mode imaging, are scaled for white color, and are normalized.

4. The intelligent color-based visual sensor as described in claim 3, wherein said currents are scaled for white color using a multiplying DAC.

5. The intelligent color-based visual sensor as described in claim 3, wherein said currents are normalized using a translinear circuit.

6. The intelligent color-based visual sensor as described in claim 1, wherein
   said means for said RGB-to-HIS transformation uses opponent color formation,
   the intensity, I, is obtained before normalization by summing RGB components,
   the saturation, S, is computed by determining a minimum of the normalized RGB values, and
   the hue, H, is given by arctan (0.866*(g-b)/(2r-g-b), where r, g and b are normalized RGB values.

7. The intelligent color-based visual sensor as described in claim 6, wherein said H values are stored as a look-up table.

8. The intelligent color-based visual sensor as described in claim 6, wherein values of said intensity and saturation are tested against on-chip thresholds.

9. The intelligent color-based visual sensor as described in claim 6, wherein a loser-take-all circuit is used to find the minimum rgb component for the saturation (S) value.

10. The intelligent color-based visual sensor as described in claim 1, wherein said means for segmentation is realized by testing HIS values of each pixel against prescribed values, and an appropriate label is applied to the pixel.

11. The intelligent color-based visual sensor as described in claim 8, wherein the rgb values above said threshold in intensity (I) and saturation (S), are mapped into a plurality of hue bins.

12. The intelligent color-based visual sensor as described in claim 1, wherein:
    said histogramming means includes a number of counters to measure a number of pixels that fall within each prescribed HIS interval of a histogram and to hold color HIS signatures of a scene,
    the HIS signatures are transferred to a memory during a learning phase, and compared to a stored template during a matching phase, and
    a error of comparison during said matching phase is presented off chip to find a best matched template.

13. The intelligent color-based visual sensor as described in claim 12, wherein the HIS signatures are compared to a stored template using sum of absolute difference (SAD) comparisons, where minimum SAD result indicates a closest match.

14. The intelligent color-based visual sensor as described in claim 1, wherein each said pixel is scanned for read-out.

15. The intelligent color-based visual sensor as described in claim 14, wherein said pixels are grouped into blocks, and the pixels within each one of said blocks is scanned in a first scan, and the entire said array is scanned in a second scan.

16. The intelligent color-based visual sensor as described in claim 1, wherein said imager is used as a front-end for the group consisting of micro-robotics, toys, "seeing eye" computers, and object identification through color signature devices.

* * * * *